(12) United States Patent
Khateri

(10) Patent No.: US 10,156,496 B2
(45) Date of Patent: Dec. 18, 2018

(54) DIFFERENTIAL LOCK AND DIFFERENTIAL TESTING DEVICE

(71) Applicant: Soresh Khateri, Sanandaj (IR)

(72) Inventor: Soresh Khateri, Sanandaj (IR)

( * ) Notice: Subject to any disclaimer, the term of this patent is extended or adjusted under 35 U.S.C. 154(b) by 146 days.

(21) Appl. No.: 13/960,597

(22) Filed: Aug. 6, 2013

(65) Prior Publication Data

US 2015/0040654 A1    Feb. 12, 2015

(51) Int. Cl.
*G01G 19/56* (2006.01)
*G01M 13/02* (2006.01)
*G01M 17/007* (2006.01)
*G01P 3/46* (2006.01)

(52) U.S. Cl.
CPC .......... *G01M 13/02* (2013.01); *G01M 17/007* (2013.01); *G01P 3/46* (2013.01)

(58) Field of Classification Search
CPC ............................ G01M 13/025; G01M 13/02
USPC ......... 73/115.01, 115.06, 865.9, 121, 188.01
See application file for complete search history.

(56) References Cited

U.S. PATENT DOCUMENTS

| | | | | |
|---|---|---|---|---|
| 4,862,736 A | * | 9/1989 | Treitz | 73/117.01 |
| 7,507,296 B2 | * | 3/2009 | Sugarman et al. | 134/6 |
| 8,424,371 B2 | * | 4/2013 | Seitz | 73/66 |

* cited by examiner

*Primary Examiner* — Lisa Caputo
*Assistant Examiner* — Nigel Plumb
(74) *Attorney, Agent, or Firm* — Azadeh Saidi

(57) ABSTRACT

Differential and differential lock test device is capable of testing every kind of tractors on tractor assembly line. This device tests the performance and noise level of tractors' both differential and its lock.

20 Claims, 5 Drawing Sheets

DIFFERENTIAL LOCK AND DIFFERENTIAL TESTING DEVICE

BACKGROUND OF INVENTION

Most tractor manufacturers do not test differential and its lock during assembly and those testing these parts generally perform field tests. It should be mentioned that field tests are dangerous and, since these parts are quite sensitive, it is impossible to identify all of their shortcomings. There is no device performing such assessments. Therefore, given the important function of tractor differential, it proves essential and crucial to have a device testing these parts during assembly. Bearing this necessity in mind, the first step in designing a test device for differential and its lock which works with every kind of tractors was taken.

SUMMARY OF THE INVENTION

Once the set of differential, axles, and final drive is assembled on the assembly line, it would be then placed on this device. Next, the electromotor moves forward using its pneumatic jack and is coupled to the differential shaft using a connecting rod. Afterwards, the brakes collection which was disengaged at needs transverse adjustment, the transverse adjustment screw would be used. This drum is mounted on the wheel axle. As the electromotor starts, the whole collection starts to rotate along with the brake drums.

Straight movement could be simulated through applying equal forces to shoes by jacks. In order to test the diff lock, the driving jack holds down the diff lock pedal to lock the differential. Then, the force imposed on tractor axles and brake drums while stuck in mud is simulated by applying unequal loads to the left and right axles. Tachometers report the RPM of axle to a computer and communicate the performance or non-performance of differential and its lock to user. Moreover, this device is capable of testing the collection's noise levels.

Device Parts:
This test device contains two major parts:
i. Mechanical
ii. Software The mechanical parts include components of the device structure and electric, hydraulic and pneumatic circuits. These parts work together to performing the testing process. FIGS. (1-1), (1-2) and (1-3) present the full view of the device and its components.

The software parts analyze the test results sent from the device to the computer which is located in the steering housing 12. Next, the results are displayed to the user.

BRIEF DESCRIPTION OF THE DRAWINGS

FIG. 1-2: Displays a close up view of different parts of the device
FIG. 1-3: Displays different parts of the device
FIG. 1-4: Shows different parts of brakes and pneumatic jack 1. This jack is functional in testing tractors with mechanical diff lock. It is used to engage the diff lock pedal.
FIG. 1-5: Is the general design of the device.

DETAILED DESCRIPTION OF COMPONENTS

Figure 1:
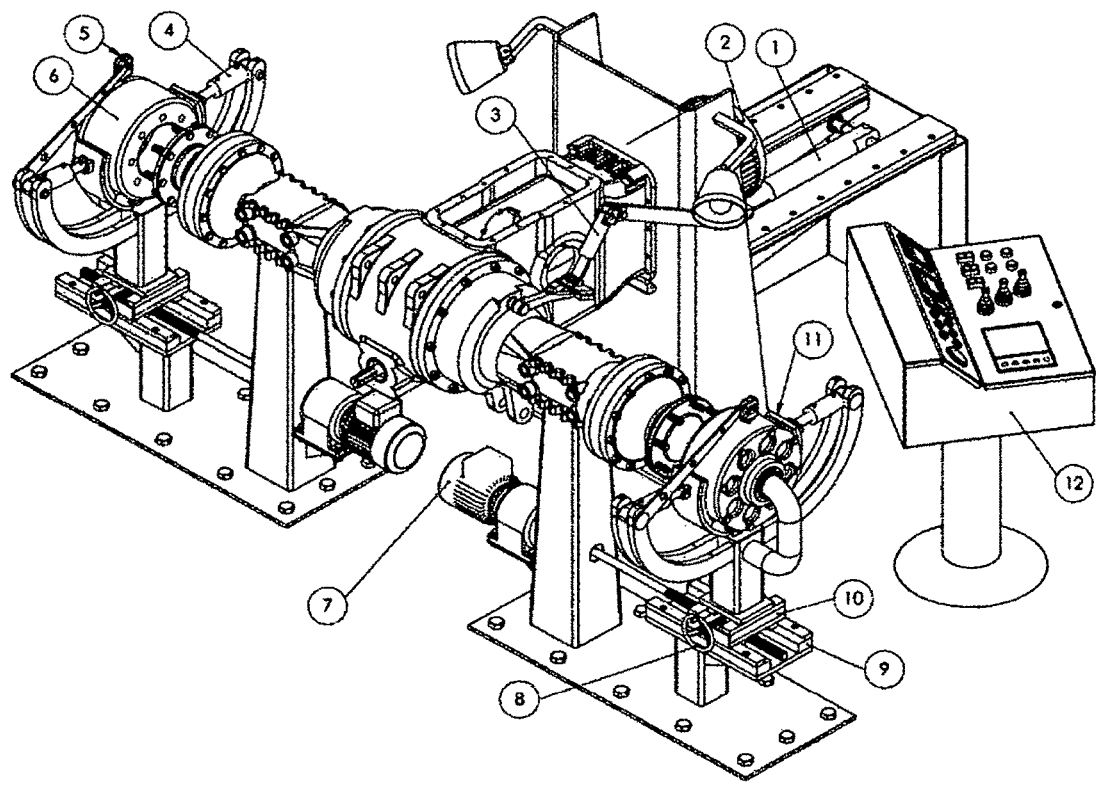
FIG. 1-1: Displays different parts of the device
Figures 1, 2:
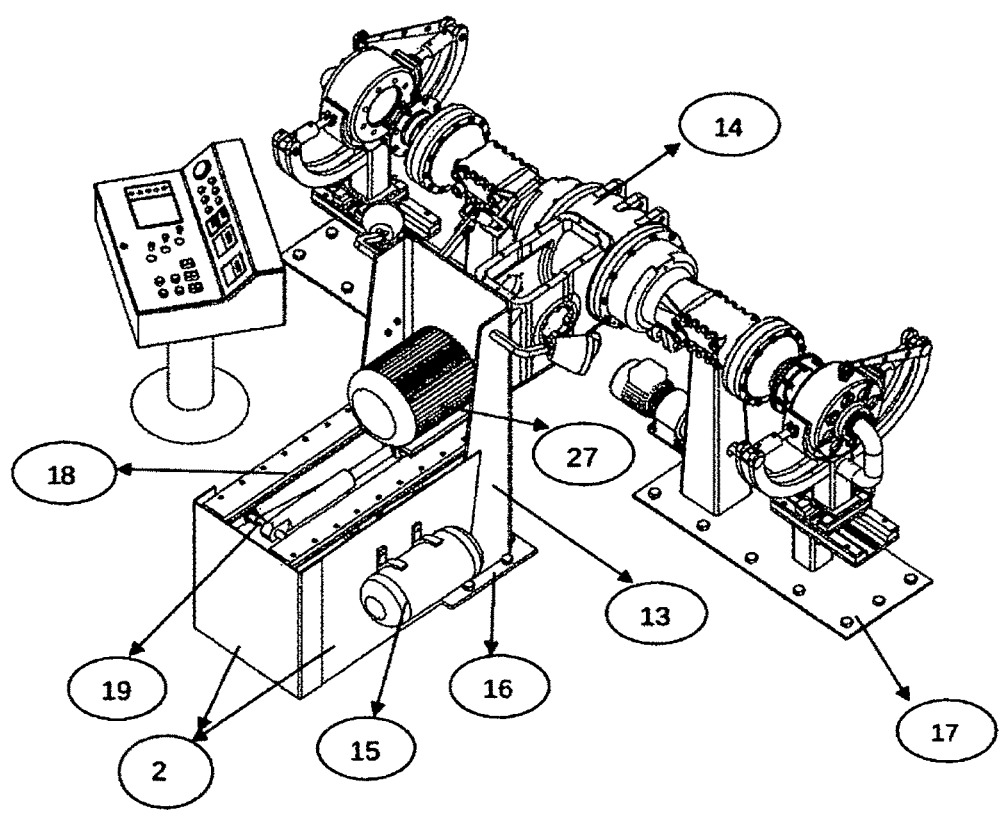
Figures 1, 2, 3:
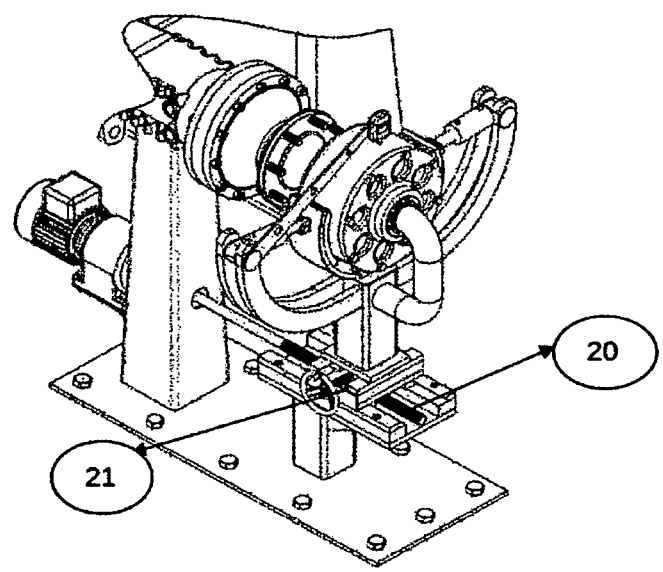
Figures 1, 2, 3, 4:
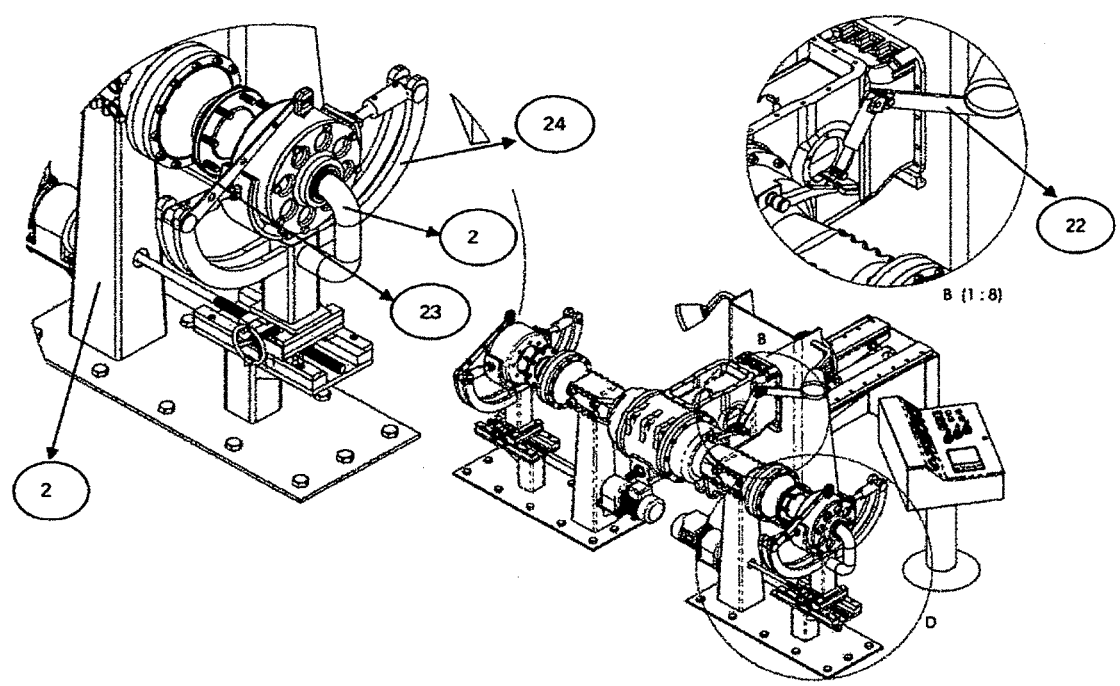
Figures 1, 2, 3, 4, 5:
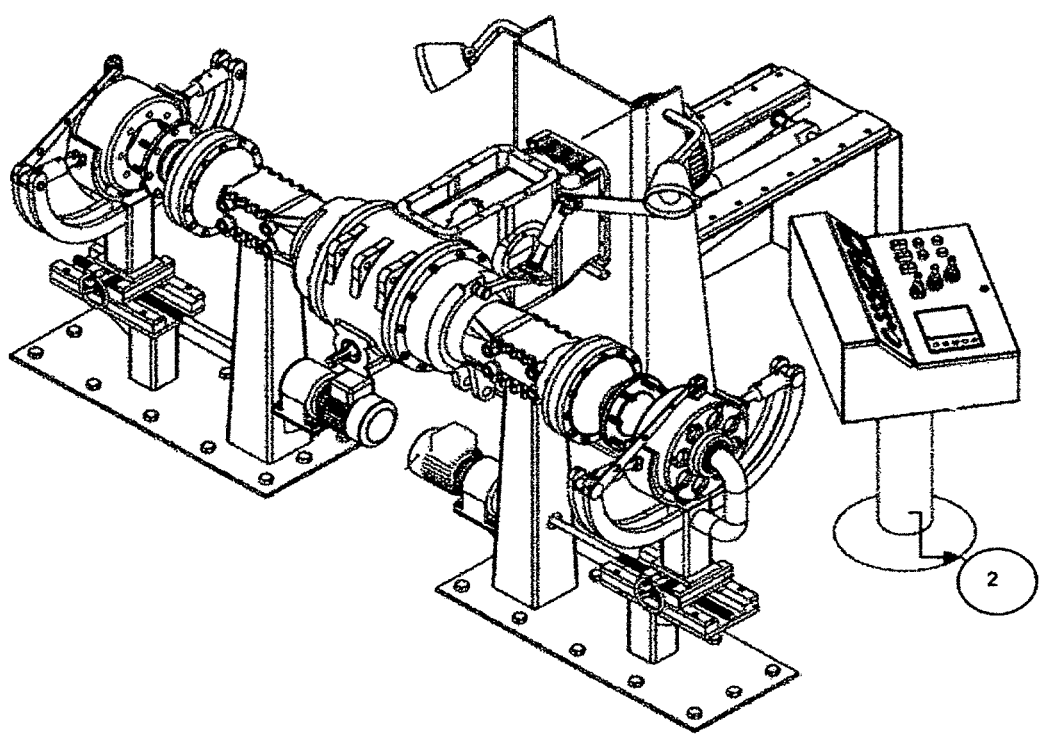

The following tasks are performed by the different components showed in the above figures:

Main Two-Way Pneumatic Jack 1:
It is responsible for displacing the electromotor along the rail 18 and its either ends are connected to electromotor base 27 and main chassis 28. The main two-way pneumatic jack functions at 6 psi pressure. This jack is attached to the stand 19 and the main electromotor base/support 27 at both ends. When the axle 14 is mounted on the device for testing, this jack would drive the main electromotor forward on the rail 18 to get engaged with the axle's shaft. Once the test ends, it would drive back the said electromotor back to its original state and disengage it from the shaft.

Main Electromotor 2:
This 40-hp motor provides the power required for testing. It is moved back and forth along the rail 18. It uses three-phase power to provide the power required for testing differential and its lock. In other words, it is the main source of power supply. This electromotor could be moved back and forth by the pneumatic jack 1 and has enough strength against overload during the test process.

Pedal Lock Pneumatic Jack 3:
This jack is responsible for engaging the differential lock pedal. It is also common in tractors in which the differential lock pedal is engaged mechanically. In tractors with hydraulic differential lock, the lock is engaged using hydraulic circuits. The pneumatic jack of the lock pedal is attached to the stand 13 through the support 22. This two-way jack engages the differential lock pedal in tractors with mechanical differential locks. It engages the lock when stretched and disengages it when returns to its initial state. The steering divider of this jack is on the steering housing 12. In hydraulic locks, this task is done by a hydraulic divider placed on the steering housing 12.

Brake Jacks 4:
These two-way pneumatic jacks 1 are responsible for imposing forces on axles. The tractor movement is simulated by these imposed forces. Each wheel should have two jacks to work under variable loads. Both axles have two two-way brake jacks responsible for imposing force on brake pads 11. This force is transferred to the axles 14 by the brake drum 6 and works against the axle's rotation; however, it never fully stops the axle. The applied force varies in different test conditions. For example, in testing differential in straight paths, equal forces are applied to both axles. However, these forces would be unequal while testing the differential lock according to the test type and conditions. This difference is applied by dividers mounted on the steering housing 12.

Tachometer 5:
Is installed on each axle, this instrument measures the axle RPM during testing and sends the data to the system's software inside the steering housing 12 for further analyses. These tachometers are attached to the main brake chassis 24 by a second support 23.

Brake Drum 6:
This part has holes as much as the axle bolts. It is mounted on the axle during testing and delivers the force imposed by brake jacks 4 to the axle. The brake drum, which is attached to the main brake chassis 24 through a ball-bearing and a second support, has as much holes as the drive wheels have bolts. The brake drum could be stretched by the electro-gearbox 7 longitudinally. The transverse adjustment bolt 21 could be used to align the axle bolt with the brake drum's holes.

Electro-Gearbox 7:
There are two 1.2-hp electro-gearboxes which are responsible for the longitudinal movement of brake drums. An electro-gearbox is predicted for each brake; i.e., totally, two electro-gearboxes are needed. When the axle 14 is mounted on the device for testing, both brake drums are moved inwards by the power bolts 20 and attached to the axles. The electro-gearbox disengages brake drums from the axle once the test is finished.

Brake Transverse Adjustment Handle 8:

This handle adjusts brakes in the transverse direction. This adjustment aligns the brake drum 6 with the wheel. The brake adjustment handle (one for each brake) is responsible for the transverse adjustment of brakes. Using this handle, the power bolt 21 moves the brake collection crosswise and adjusts it according to the type of tractor. Other objectives of this handle are adjusting the brake drum 6 with the tractor axle 14.

Brake Longitudinal Adjustment Rails 9:

This rail conducts brakes during mounting and dismounting and also during longitudinal adjustment. The brake's longitudinal adjustment rails are attached to the electro-gearbox 7 through the power bolts 20. When the electro-gearbox 7 starts to rotate, its rotational motion is converted to a straight line motion through the power bolts 20 and, therefore, adjusts the brake collection longitudinally on the rail. In fact, these rails guide brakes while they engage or otherwise disengaged.

Brake Transverse Adjustment Rails 10:

They are responsible for conducting brakes during crosswise alignment. The brakes transverse adjustment rail facilitates the movement of brake collection in the transverse direction. The transverse movement is performed using the brake adjustment handle 8 and power bolts 21. In fact, these rails guide brakes during transverse adjustment.

Brake Pads 11:

These pads are placed on the brake drum 6. They prevent axles from rotation when receiving force from jacks. Each brake has two pads which are connected to the break jacks 4. The jacks force the pads upon the brake drum 6. Given the high friction coefficient between these pads and the brake surface, the axle 14 rotation is resisted. In fact, a force is imposed on the axle. This force is not constant during the test. As the test ends and the jacks are closed, pads are released from the brake drum and the force is removed from the axle.

Steering Housing 12:

The steering housing which is connected to the ground by a support includes pneumatic and hydraulic dividers. This component steers the pneumatic jacks 1 and lubrication circuits. The steering housing consists of a computer and software which report results to the user. The steering housing contains electronic, pneumatic and hydraulic circuits. The steering housing is fixed to the ground through a support 29 in the way that the user can easily access the handles and different parts. The pneumatic dividers mounted on this housing are responsible for the movement of the pneumatic jacks and the hydraulic dividers (also placed on this housing) are responsible for starting up the hydraulic circuits and lubrication. There is a display on the steering housing which displays the results to the user. The software system in this section analyzes the results received from the device during the test process and displays the results.

Stand 13:

This section which is fixed to the ground by a support 16 from one end and to the rail chassis 18 from the other end is responsible for holding the axle 14 during testing.

Axle 14:

It is a tractor's rear axle which is mounted for testing. This part is mounted by the user and is held tight by the stand 13 until the test ends.

Air Compressor 15:

Provides the air flow required for the performance of pneumatic jacks 1 and circuits and would release the pressurized air through dividers towards the consumers (i.e. pneumatic jack 1).

Electromotor Support 16:

The electro motor's chassis and attachments are fixed to the ground through this support. It is bolted to the ground, is where the stand 13, electromotor chassis 28 and its attachments are mounted. This part should have sufficient strength to remain motionless and fixed during the test process. In order to properly attaching a tractor's axle 14, the support should be level.

Brakes Support 17:

Brakes chassis along with the electro-gearbox 7 and its attachments are fixed to the ground using this support. There are two brake supports on which brakes and axle support 26 are mounted. They are bolted to ground. As with the electromotor support, these supports should also have sufficient strength and should be motionless during the test process. Moreover, they should be horizontally and vertically leveled.

Main Electromotor Rail 18:

In order to engage to or disengage from the differential collection, the main electromotor is driven back and forth on this rail by the pedal lock pneumatic jack 3. The electromotor rail is placed beneath the electromotor support 27 and is responsible for guiding the electromotor 2 while being moved back and forth. This rail is attached to the electromotor main chassis 28 at one end and to the stand 13 at its other end.

Pneumatic Jack's Support 19:

This is where the pneumatic jack (which drives the main electromotor 22) is mounted on.

Longitudinal Adjustment Screw 20:

This power screw is connected to the electro-gearbox's output 7 at one end and to the brake main chassis 24 at the other end; and drives the brakes longitudinally. As the electro-gearbox 7 rotates, this screw attaches and detaches the brakes to axle 14.

Brake Transverse Adjustment Screw 21:

Aligns the brakes across the transverse direction. This screw is also a power bolt, one for each brake. Turning the adjustment handle 8, this screw moves the brake set on rail 10 crosswise and aligns the brake drum 6 with the axle 14 at this direction.

Jack Support 22:

This support connects the pneumatic jack 1 used in engaging the differential lock pedal to the stand 13. The jack support is responsible for attaching the differential lock 3 to the stand 13. This support could be adjusted in both directions.

Tachometer Support 23:

Connects the tachometers 5 to the brake's main chassis 24. It carries the tachometers during the different phases of the test process. The elevation and transverse position of this support could be adjusted according to the tractor and test types.

Brake's Main Chassis 24:

Maintains and supports different components of the brake section. It consists of different components, including the brake drum 6, and the brake jacks 4 are mounted on it. Tachometers 5 are also fixed to this chassis through the tachometer support 23. This chassis is driven longitudinally by the electro-gearbox 7 on the rail 9, while it could be adjusted in the transverse direction on the rail 18 by turning the brake adjustment handle 8.

Brake Drum Support's Ball-Bearing 25:

Maintains and supports the brake drum 6. It also connects the brake drum to the brake's main chassis 24. The brake drum's ball-bearing which is at its center facilitates the rotation of the brake drum 6 during the axle rotation during the test process. This part acts as a support for the brake drum and continually holds it.

Axle Supports 26:

It is connected to the brakes support 17 and the axle is mounted on it during testing and it is attached to the electro-gearbox 7 from beneath Main Electromotor Support 27:

The electromotor 2 is mounted on this support. It is attached to the rail 18. The end of main pneumatic jack 1 is also attached to this support. As the jack 1 is stretched or closed, it is moved back and forth on the main electromotor rail 18.

Main Chassis 28:

It holds the main electromotor 2, main electromotor support 27, and electromotor rail 18 and its attachments are fixed to the ground by the support 16. The stand 13 is attached to this chassis at one end and to the support 16 at the other end.

Steering housing Support 29:

Connects the steering housing 12 to the ground. This support should be designed to give the user full command of the display's control tools.

DETAILED DESCRIPTION OF SPECIFICATION

Differential is one of the most important parts of power transmission of a tractor. It is responsible for a list of crucial functions and could cause serious problems if malfunctions. The main functions of a differential are changing the power transmission direction by 90 degrees and allowing the wheels with different speeds during vehicle turning. Either of these functions is performed by a certain part of differentials. Often, in tractors, it is necessary to stop the differential from functioning by locking it.

This usually happens when a wheel is stuck in the mud and experience wheelspin while the other wheel on a hard ground. In order to pull the tractor out of this situation, the diff locks are used. This device locks both wheels axles together. In this state, the RPM of both wheels are equal; however, more torque is directed towards the wheel on the ground, which eventually allows the tractor to slowly come out of this situation.

The importance of differential and its lock for tractors necessitates their testing on assembly line. Tractor manufacturers test these parts on the field which is less safe. The test device shown in FIG. 1-1) is capable of testing differential and its lock during the assembly and indicating whether they perform. These two parts are tested by simulating every condition which could potentially occur to them. The information from mechanical parts and tachometer is sent to the system's software. Afterwards, the computer analyzes and displays the results to the user.

An Overview of the Differential and Differential Lock Test Device for Different Tractors:

This device is designed to test the differential and differential lock of different tractors. The device's functions are twofold:

1. Testing tractors with mechanical differential and differential lock.
2. Testing tractors with hydraulic differential and differential lock.

According to the above figures, the device test procedure is as follows:

a) Testing Tractors with Mechanical Differential Lock

In these tractors, first the axle 14 should be assembled to the device and fixed to the stand 13 and support 26 throughout the test process. Once the axle is in place, the lubrication circuits deliver the required oil to prevent parts abrasion in the differential set. Next, the brake drum 6 is placed on the axle outlet (where wheels are attached) through the transverse adjustment. The brakes (which were disengaged at the end of the previous test to dissemble the axle) are re-engaged to the new axle by the electro-gearbox.

When the brakes are engaged, the electromotor 2 is coupled to the differential inlet. This is done through the steering circuits inside the steering housing 12. At the end of this stage, the test process begins as follows.

a-1) Testing Differential Along a Straight Course

Following the above-mentioned procedure, the tractor's axle is ready for the test. In this stage, the differential's noise level and performance is examined on a straight course. The brake jacks 4 deliver equal force to the engaged brakes and the tachometers start measuring the axle's output RPM and send the results to the steering housing 12 for analysis. A noise sensor also sends the noise level of axle 14 to the computer and software inside the steering housing 12. The software analyzes and displays the noise results to the user.

a-2) Testing Differential on Turns

In this phase, the pneumatic jacks 1 deliver unequal forces to the brakes 4 and thus simulate the tractor's turning. Here, the axle's output RPM is determined and sent to the computer inside the steering housing 12 for analysis by the tachometers. The results are then displayed to the user. The noise sensor also records the noise level throughout the test process and sends it to the computer for analysis. The results are then displayed on the monitor.

a-3) Testing Differential Lock

This device is capable of measuring different differential locks. The test procedure is identical for all types of differential locks. However, there is a difference in how the differential lock is driven. In testing mechanical dill locks, the jack 3 is used for engaging the differential lock, and, in hydraulic variants, this is performed by the hydraulic circuits inside the steering housing 12. Once the differential lock is engaged, the brakes would receive unequal forces from the brake jacks 4 on the brake drum 6. This simulates the setting in which it is essential to engage the differential lock. Once the forces are in place, the RPMs of both axles are measured by the tachometers 5 and the results are sent to the computer inside the steering housing 12 for analysis. The noise level is also measured in this process.

b) Testing Tractors with Mechanical Differential Lock

All test phases for these tractors are similar to those of tractors with mechanical differential lock. The only difference is in how the differential lock is engaged. In tractors with mechanical diff locks, this task is performed by the jack 3, while, in tractors with hydraulic differential lock, the hydraulic circuits are responsible for this task. It is noteworthy that, with just a few modifications, this device would be capable of testing non-mechanical and non-hydraulic differential locks.

The device is made of ST-37 and ST-52 steels with different thicknesses. Electroplated steels were used for rails 18, 9 and 10 since they are subjected to constant abrasion. The electro-gearboxes' power was 1.2 hp and also a 40-hp electromotor was used.

It is understood that the above description and drawings are illustrative of the present invention and that changes may be made in materials, design and programming without departing from the scope of the present invention as defined in the following claims.

The invention claimed is:

1. A differential lock and a differential testing device for testing tractors comprising: a) a main two-way pneumatic jack; b) a main electromotor; c) pedal lock pneumatic jack; d) brake jack; e) tachometers; f) brake drum; g) electro-gearbox; h) brake transverse adjustment handle; i) brake longitudinal adjustment rails; j) brake transverse adjustment rails; k) brake pads; l) steering house; m) axles; n) air compressor, providing air flow required for performance of said pneumatic jacks; o) support of said main electromotor, which remains motionless and fixed to ground during test process; p) main electromotor rail; q) longitudinal adjustment screw; r) brake transverse adjustment screw; s) main chassis.

2. A differential lock and a differential testing device for testing tractors of claim 1; wherein said two-way pneumatic jack displaces said main electromotor along said main electromotor rail and from one end is connected to an electromotor base and from one end to said main chassis; during testing said axles are mounted on said device and said two-way pneumatic jack will drive said main electromotor forward on said main electromotor rail where said main electromotor will be engaged with a shaft of said axles; when said testing is complete said main electromotor is driven back to its original state before engagement and will be disengaged from said shaft.

3. A differential lock and a differential testing device for testing tractors of claim 2; wherein said main electromotor provides enough power during said testing and is moved back and forth along said main electromotor rail; said main electromotor uses three phase power testing differential and differential locks.

4. A differential lock and a differential testing device for testing tractors of claim 3; wherein said pedal lock pneumatic jack engages with a differential lock pedal, where said pedal lock pneumatic jack is attached to a stand through support of said main electromotor and wherein it engages with said differential lock pedal when stretched and disengages when returned to its initial state.

5. A differential lock and a differential testing device for testing tractors of claim 4; wherein said axles comprise two of said brake jacks; wherein said brake jacks impose force on said brake pads; said force is transferred to said axles by said brake drum and works against a rotation of said axles; however it never fully stops said axles.

6. A differential lock and a differential testing device for testing tractors of claim 5; wherein said force varies in different test conditions; wherein in said testing a differential in straight paths, an equal amount of said force is applied to said axles and uneven amount of said forces are applied while testing said differential lock according to different test types and conditions; wherein said uneven amount of said force is applied by steering dividers mounted on said steering housing.

7. A differential lock and a differential testing device for testing tractors of claim 6; wherein said tachometer is installed on said axles and measures PRM of said axles during said testing and sends data received to a programming and analyzing unit inside said steering housing for further analysis and wherein said tachometers are attached to brakes of said main chassis of a tachometer support.

8. A differential lock and a differential testing device for testing tractors of claim 7; wherein said brake drum is mounted on said axles during said testing and delivers said force imposed by said brake jacks on said axles; wherein said brake drum is stretched by said electro-gearbox longitudinally.

9. A differential lock and a differential testing device for testing tractors of claim 8; wherein said brake transverse adjustment handle; adjusts said brake drum in a transverse direction and aligns it with wheels of said tractor's.

10. A differential lock and a differential testing device for testing tractors of claim 9; wherein said brake longitudinal adjustment rails are attached to said electro-gearbox through power bolts.

11. A differential lock and a differential testing device for testing tractors of claim 10; wherein said brake transverse adjustment rails conducts said brake drums during a crosswise alignment and it facilitates movement of said brake drums collection in a transverse direction.

12. A differential lock and a differential testing device for testing tractors of claim 11; wherein said brake pads are placed on said brake drums, preventing said axles from rotation when receiving said force from two-way pneumatic jacks, and wherein said brake pads are connected to said brake jacks; wherein a rotation of said axles are resisted due to a high friction coefficient between said brake pads and a surface of said brake drums.

13. A differential lock and a differential testing device for testing tractors of claim 12; wherein said steering housing is fixed to ground through a support of said steering housing, where it steers said two-way pneumatic jacks and comprises said programming and analyzing unit, pneumatic steering dividers, a display unit connected to said programming and analyzing unit displaying results to an operator of said tractors.

14. A differential lock and a differential testing device for testing tractors of claim 13; wherein said longitudinal adjustment screw is connected to an output of said electro-gearbox at one end and to said main chassis brakes at another end, and drives said brake drums longitudinally, and when said electro-gearbox rotates, said longitudinal adjustment screw attaches and detaches said brake drums to said axles.

15. A differential lock and a differential testing device for testing tractors of claim 14; wherein said brake transverse adjustment screw aligns said brake drums across a transverse direction and moves said brake drums along said brake transverse adjustment rail and aligns said brake drums with said axles.

16. A differential lock and a differential testing device for testing tractors of claim 15; wherein said main chassis holds said main electromotor and said main electromotor support and said main electromotor rail.

17. A differential lock and a differential testing device for testing tractors of claim 16; wherein said pneumatic steering dividers for said pedal lock pneumatic jack is on said steering housing.

18. A differential lock and a differential testing device for testing tractors of claim 17; wherein said device works with all kinds of tractors.

19. A differential lock and a differential testing device for testing tractors of claim 18; wherein said tractors are tested on an assembly line inside a factory and wherein said testing is more accurate than a field test and wherein said testing is used in industrial and research centers.

20. A differential lock and a differential testing device for testing tractors of claim 19; wherein said testing ensures safety of said differential and said differential lock and enhances product quality of tractor manufacturers.

* * * * *